US008908929B2

(12) United States Patent
Bolle et al.

(10) Patent No.: US 8,908,929 B2
(45) Date of Patent: Dec. 9, 2014

(54) METHOD, APPARATUS AND COMPUTER PROGRAM PRODUCT IMPLEMENTING ANONYMOUS BIOMETRIC MATCHING

(75) Inventors: Rudolf M. Bolle, Bedford Hills, NY (US); Nalini K. Ratha, Yorktown Hts, NY (US); Jonathan H. Connell, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1644 days.

(21) Appl. No.: 11/939,135

(22) Filed: Nov. 13, 2007

(65) Prior Publication Data

US 2009/0123034 A1 May 14, 2009

(51) Int. Cl.
*G06K 9/00* (2006.01)
*G06K 9/62* (2006.01)

(52) U.S. Cl.
CPC .......... *G06K 9/6232* (2013.01); *G06K 9/00885* (2013.01)
USPC ....................................................... 382/115

(58) Field of Classification Search
None
See application file for complete search history.

(56) References Cited

U.S. PATENT DOCUMENTS

| 6,836,534 | B2 | 12/2004 | Carmena | 378/111 |
| 6,836,554 | B1 | 12/2004 | Bolle et al. | 382/116 |
| 7,773,784 | B2* | 8/2010 | Boult | 382/124 |
| 2004/0019570 | A1* | 1/2004 | Bolle et al. | 705/64 |
| 2006/0133651 | A1* | 6/2006 | Polcha et al. | 382/115 |
| 2006/0293925 | A1* | 12/2006 | Flom | 705/3 |

OTHER PUBLICATIONS

Braithwaite, Michael; Cahn von Seelen, Ulf; Cambier, James; Daugman, John; Glass, Randy; Moore, Russ; Scott, Ian; "Application-Specific Biometric Templates", 2002, Iridian Technologies Inc.; pp. 1-10.*

* cited by examiner

*Primary Examiner* — Kim Vu
*Assistant Examiner* — Fred Hu
(74) *Attorney, Agent, or Firm* — Harrington & Smith

(57) ABSTRACT

Method, apparatus and computer program product compare biometrics in an anonymous manner. A first collection of biometrics is transformed using a first cancelable non-invertible biometric transform to create a first collection of transformed biometrics. A second collection of biometrics is transformed using the first cancelable non-invertible biometric transform to create a second collection of transformed biometrics. The first and second collection of transformed biometrics are then compared in the transformed domain to determine if any of the transformed biometrics from the first collection match any of the transformed biometrics from the second collection. If a match is found, the parties respectively maintaining the first and second collections of biometrics exchange information confidential nature of the biometrics are maintained by the entities responsible for the collections, since the biometrics are not compared in an untransformed state.

14 Claims, 6 Drawing Sheets

METHOD, APPARATUS AND COMPUTER PROGRAM PRODUCT IMPLEMENTING ANONYMOUS BIOMETRIC MATCHING

TECHNICAL FIELD

The invention generally concerns biometrics for use in identifying individuals, and more particularly concerns comparing collections of biometrics to find matches in the collections, wherein the biometrics are compared in a transformed manner that preserves their anonymity.

BACKGROUND

Due to the perceived increase in violence in the world, particularly violence perpetuated by so-called "terrorists", there is an ever-increasing desire to improve security. Security means the ability to identify and prevent violent events before the events occur. In order to identify and prevent violent events, it usually is necessary and often mandatory, to identify individual who will foment the violence.

This is often a difficult task. A group of individuals under surveillance may sympathize with terrorists but may have neither the contacts nor the desire to engage in terroristic activities themselves. The ability to determine whether any members of the group have contacts with terrorists, or are themselves terrorists, is often difficult without a positive identification or overt acts preparing or perpetrating terroristic activities. It is a commonplace that terrorists use aliases and disguises that make positive identification difficult, if not impossible.

One method to positively identify individuals is through biometrics. Biometrics—fingerprints, retinal details, facial appearance, etc.—are unique to individuals and difficult to counterfeit. A problem with biometrics is that biometrics usually only are collected from individuals who already have run afoul of security apparatus or the criminal justice system. Civil libertarians view widespread collection of biometrics solely for the purpose of security as an invasion of privacy and resist efforts by government to make biometric collection mandatory.

Nonetheless, those seeking a service from a private entity, often agree to provide a biometric in exchange for the service such as, for example, an airline flight. Even though the biometrics are provided voluntarily, the individuals providing the biometrics desire that they be used only for limited purposes. In particular, the expectation is that the provided biometrics will be compared to collections of biometrics collected from individuals who are security threats. Since most individuals providing the biometrics in the example airline flight situation are law-abiding, they have no problem with providing a biometric sample for a limited purpose. Individuals, nonetheless, do not desire that other entities be able to collect their biometrics and add them to a permanent collection solely because they desire to take an airline flight, for instance.

Similar concerns arise when a private employer seeks to use biometrics for employee screening purposes. The private employer does not wish to add to the permanent collection of, for example, the FBI by providing the FBI with identity information associated with biometrics for individuals that the FBI does not have records for. Instead, the private employer only desires to know if potential employees have criminal records.

There are additional concerns arising from situations where intelligence has been gathered regarding individuals and subversive groups that pose security risks. When security agencies from different countries, or even within a country, seek to exchange information regarding individuals who pose security risks, the agencies are often confronted with problems associated with disclosure. For instance, a first security agency may have identified a particular individual as a security risk, and discloses this information to the second security agency to determine if the second security agency knows anything about the activities of the individual. It may turn out that the individual is unknown to the second security agency. If the second security agency has been infiltrated by moles, a mole may tip off the individual that he is known to the first security agency as a potential security risk. Accordingly, security agencies are reluctant to disclose lists of individuals for screening and intelligence gathering purposes to other security agencies because the disclosure may be made known to the individuals on the list who can then change their behavior by, for instance, switching operations to a new country. In addition, if a list is denominated as, for example, "all individuals from subversive group A known to the first security agency that pose a threat", when the list is disclosed to the second security agency, the mole can identify if anyone from subversive group A has escaped the attention of the first security agency. Further, there may be restrictions on the type of information that may be divulged to the security agency of a different country. For example, the country of a security agency may not allow biometrics of its citizens to be disclosed to a security agency from another country.

Accordingly, there is an increasing desire for entities that wish to use biometrics for screening purposes to be able to use them in a manner that satisfies their customers. For instance, the entities desire methods and apparatus that allow them to perform the screening operation without serving as an effective collecting apparatus for other entities who desire to have a biometric for as many individuals as possible to improve security.

SUMMARY OF THE INVENTION

A first embodiment of the invention is a method comprising: transforming a first collection of biometrics and a second collection of biometrics with at least one cancelable non-invertible biometric transform; comparing transformed biometrics from the first collection with transformed biometrics from the second collection; and if a match is found, recording information identifying the match.

A second embodiment of the invention is an electronic device comprising: at least one memory configured to store at least one computer program; and a processor configured to execute the at least one computer program, wherein when the computer program is executed by the processor, the electronic device is configured to transform each biometric in a first collection of biometrics using at least one cancelable non-invertible biometric transform; and to transmit the first collection of transformed biometrics to a remote entity so that the first collection of biometrics can be compared to a second collection of transformed biometrics.

A third embodiment of the invention is an electronic device comprising: at least one memory configured to store at least one computer program; and a processor configured to execute the at least one computer program, wherein when the computer program is executed by the processor, the electronic device is configured to receive a first collection of transformed biometrics, each of the biometrics transformed with at least one cancelable non-invertible biometric transform to generate a transformed biometric; to transform a second collection of biometrics using the at least one cancelable non-invertible biometric transform; to compare the transformed biometrics from the first collection with the transformed biometrics from the second collection; and to identify transformed biometrics from the first collection that match transformed biometric from the second collection.

A fourth embodiment of the invention is a computer program product comprising a computer readable memory medium tangibly embodying a computer program, the computer program configured to operate an electronic device when executed, wherein when executed, the computer program is configured to cause the electronic device to transform each biometric in a first collection of biometrics using at least one cancelable non-invertible biometric transform; to transmit the first collection of transformed biometrics to a remote entity so that the first collection of transformed biometrics can be compared to a second collection of transformed biometrics, the second collection of transformed biometrics transformed with the at least one cancelable non-invertible biometric transform; and to receive a result of the comparison, wherein the result indicates whether any transformed biometrics from the second collection of transformed biometrics were found to match a transformed biometric from the first collection.

A fifth embodiment of the invention is a computer program product comprising a computer readable memory medium tangibly embodying a computer program, the computer program configured to operate an electronic device when executed, wherein when executed the computer program is configured to operate the electronic device to receive a first collection of transformed biometrics, each of the biometrics transformed with at least one cancelable non-invertible biometric transform to generate a transformed biometric; to transform a second collection of biometrics using the at least one cancelable non-invertible biometric transform; to compare the transformed biometrics from the first collection with the transformed biometrics from the second collection; and to identify transformed biometrics from the first collection that match transformed biometrics from the second collection.

In conclusion, the foregoing summary of the various embodiments of the present invention is exemplary and non-limiting. For example, one or ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Invention, when read in conjunction with the attached Drawing Figures, wherein.

DETAILED DESCRIPTION OF THE INVENTION

Aspects of the invention can be embodied in methods, apparatus and computer program products. Before proceeding with a description of the methods of the invention, a description of a networked system configured in accordance with the invention will be provided.

Figure 1:
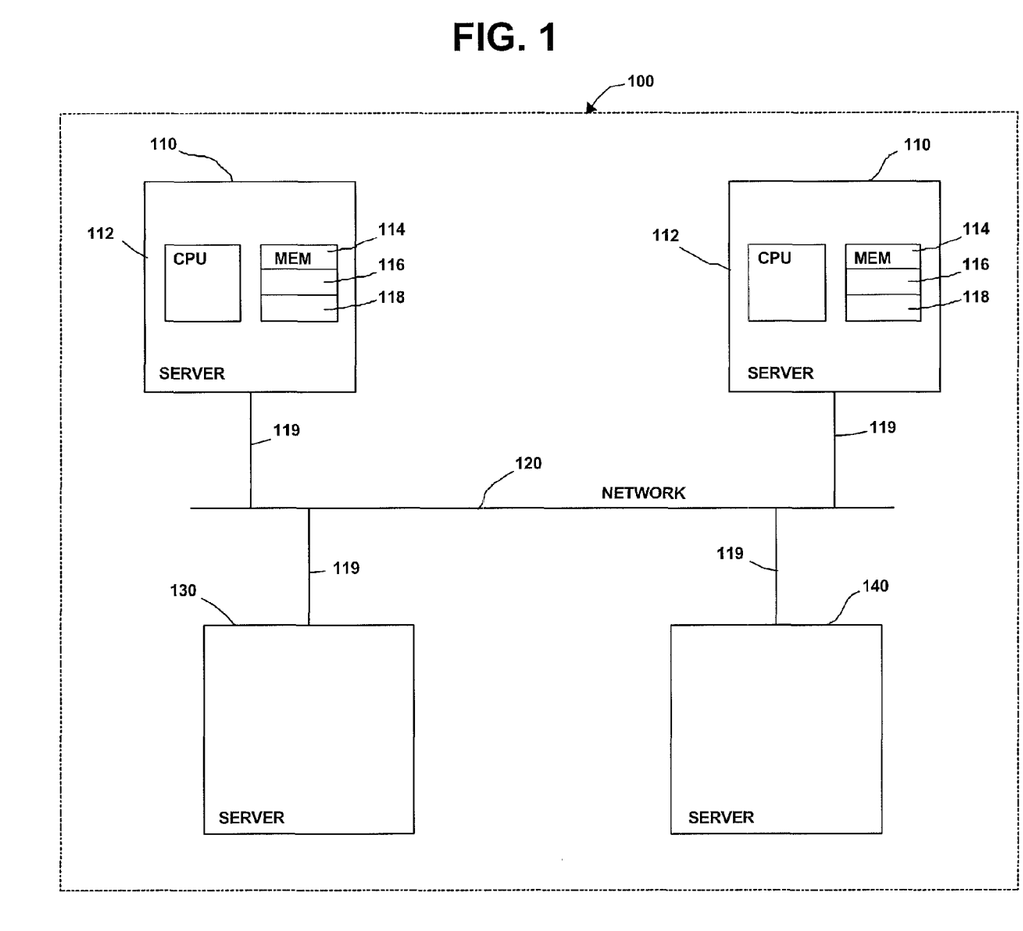
FIG. 1 is a block diagram of a system capable of operating in accordance with the present invention.

FIG. 1 depicts the networked system 100. The networked system 100 comprises a plurality of servers 110, 130 and 140. Servers 110 comprise a processor 112 for executing programs capable of performing methods in accordance with the invention; memories 114 for storing computer programs 116 capable of operating in accordance with the invention; biometrics and associated identity information 118; and network interfaces 119. The network interfaces 119 connect the servers 110, 130 and 140 to network 120.

Server 130 may comprise a remote source of identity information to be used with biometric information stored in one of the servers 110. For instance, an entity for liability reasons associated with the risk of unintended disclosure may not desire to store the biometric information and identity information identifying the individuals associated with the biometric information on the same server. In such a situation, if one of the servers were to be "hacked", a hacker may be able to access both the biometric information and identity information identifying the individuals associated with the biometrics, a highly undesirable outcome. By separately storing the biometric information and the identity information, a hacker would have to compromise both server 110 and server 130, making the possibility of unintended disclosure more unlikely. Server 140 may store biometric information that can be operated on by at least one of the servers 110.

The system depicted in FIG. 1 is an exemplary and non-limiting depiction of systems and apparatus capable of operating in accordance with the invention. One of ordinary skill in the art will understand that invention can be practiced in systems that differ from that depicted in FIG. 1.

Now having described a system configured in accordance with the invention, methods in accordance with the invention will be described. In embodiments of the invention single or multiple cancelable non-invertible biometric transforms are applied to collections of biometrics and the transformed biometrics are then compared in the transform domain. When a match is found, one party can ask for more details in the open domain.

Figure 2:
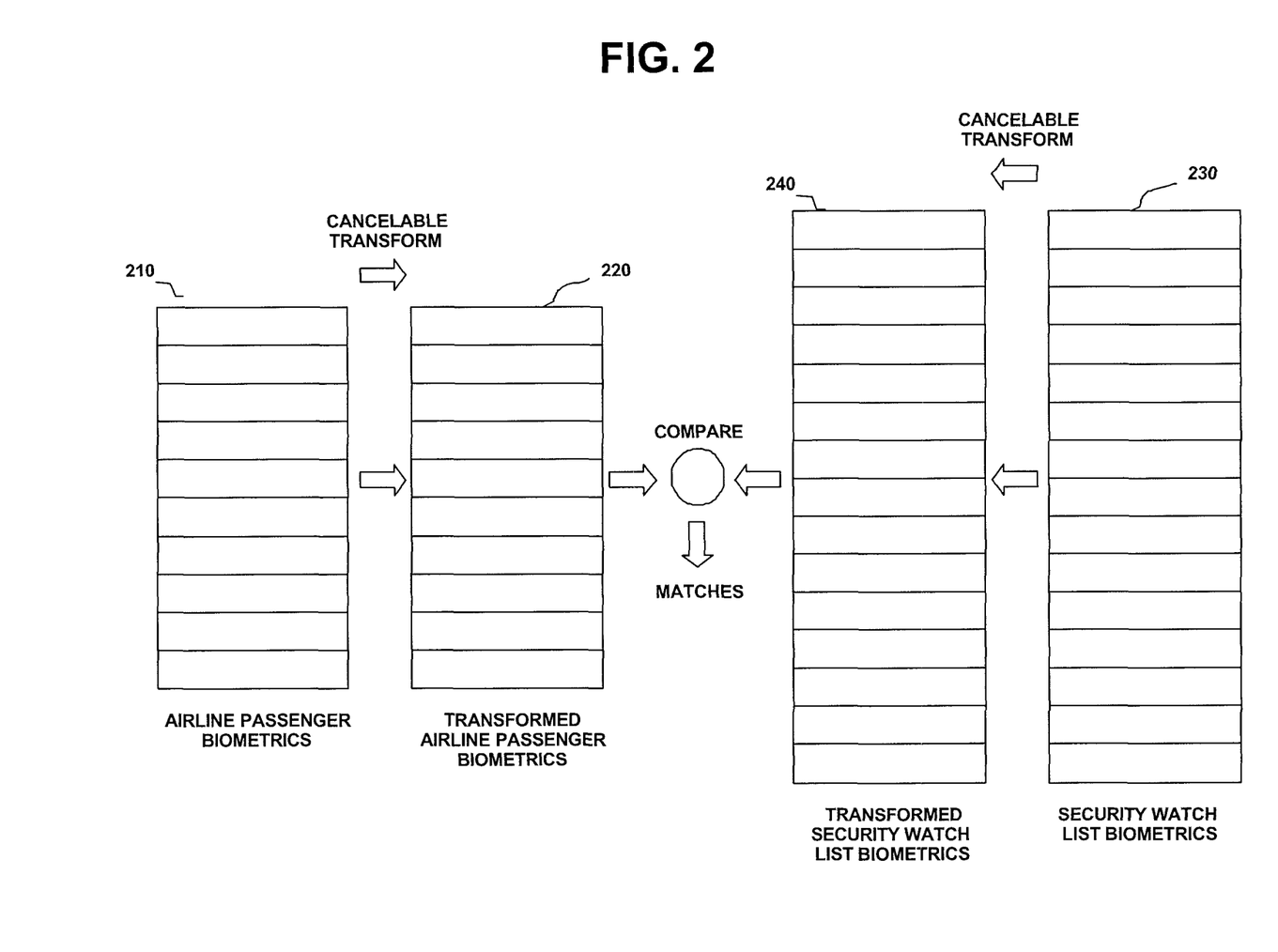
FIG. 2 is a conceptual diagram depicting operation of a method in accordance with the invention.

As shown in FIG. 2, a first method operating in accordance with the invention transforms two collections of biometrics 210 and 230 using a single cancelable non-invertible biometric transform all biometrics in collections 210 and 230 are transformed in the same way) to create transformed collections 220 and 240. A cancelable biometric transform, when applied to a biometric, creates an intentional distortion of the biometric of the same format as the original biometric. The distortion is repeatable in the sense that, irrespective of variations in recording conditions of the original biometric, it generates the same (or very similar) distorted biometric each time. A non-invertible biometric transform means that the cancelable biometric transform can not be reversed to reveal the untransformed biometric, thus preserving the anonymity and privacy of the biometric. Cancelable, non-invertible transforms are described in greater detail in U.S. Pat. No. 6,836,554, which is hereby incorporated by reference in its entirety as if fully restated herein.

Each biometric from collection 220 is then compared to transformed biometrics from collection 240 until a match is found or until the particular transformed biometric from the first collection has been compared to all of the transformed biometrics from the second collection and no match is found. For each match a record is created identifying the match. For events where there is a considerable match, the entities involved operate in accordance with established protocols depending on risk. For example, in a situation involving air transport, if the match corresponds to an individual who is a known hijacking threat, then the security agency can instruct the airline to alert the local law enforcement authorities to take the individual into custody. Alternatively, if the individual is not a hijacking threat, but nonetheless is of interest to the authorities, the security agency may instruct the airline to take no action, and to provide the security agency with details about the individual's destination, and possibly a surveillance photograph to record the individual's current appearance.

Figure 3:
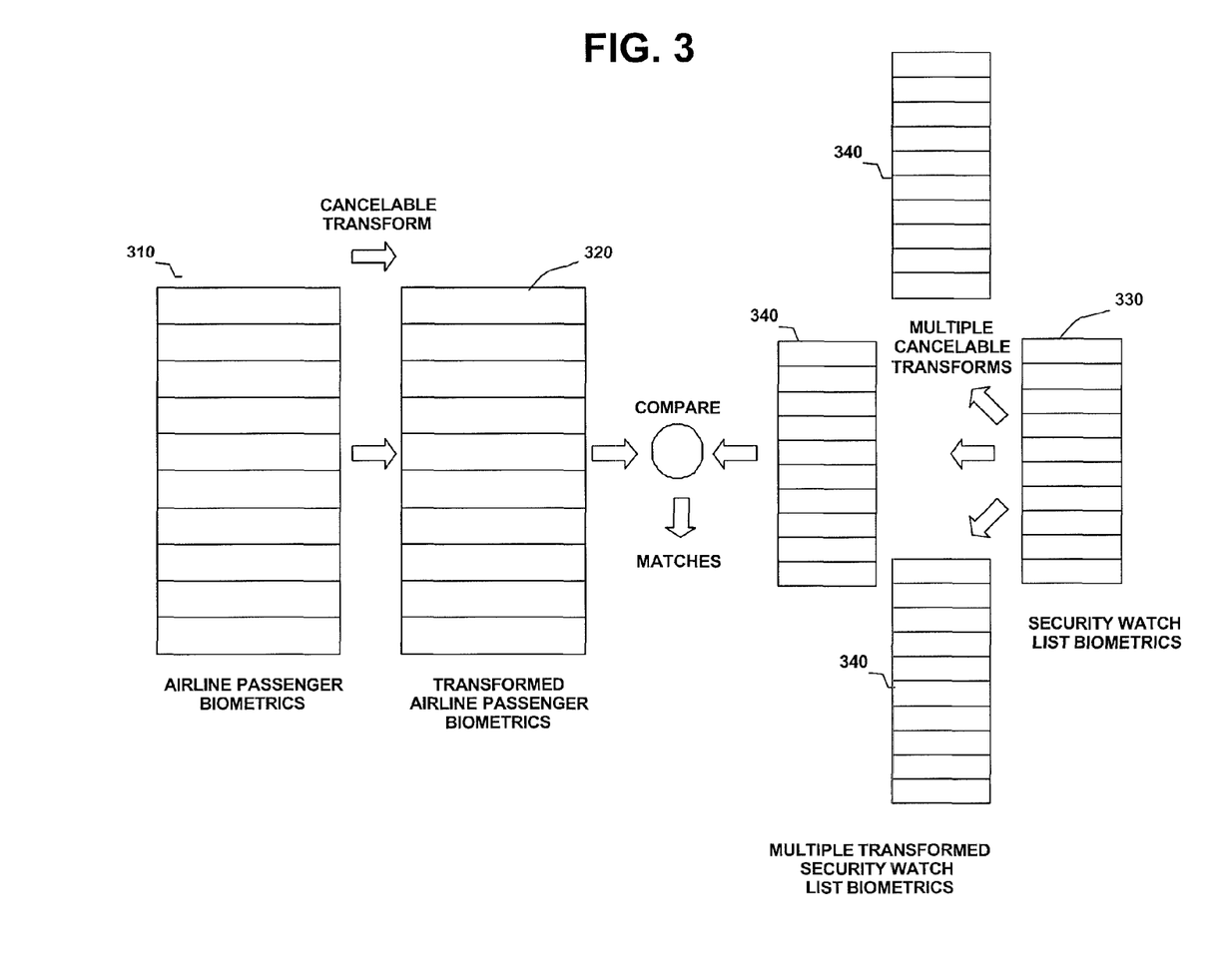
FIG. 3 is a conceptual diagram depicting operation of another method in accordance with the invention.

In a second method depicted in FIG. 3, cancelable non-invertible biometric transforms are randomly selected from a collection of cancelable non-invertible biometric transforms and applied to each of the biometrics in collection 310 to create a collection of transformed biometrics 320 (where each biometric in collection 320 has likely been transformed with a different cancelable non-invertible biometric transform). Biometrics in collection 330 are transformed using all the possible transforms creating collections of transformed biometrics 340 for each cancelable non-invertible biometric transform. Then each transformed biometric from collection 320 is compared to each biometric generated using the various available cancelable non-invertible biometric tranforms at least until a match is found or until the biometric has been compared to all available transformed biometrics and no match is found. If there is a match against any record from any of the transformed databases, the original biometric and details will be requested. Note that this is a more expensive solution (computationally) but provides more privacy and security. However, with a large space of possible transforms, or a large set of possibilities less than the maximum allowed by the method, the cardinality of Cancelable Transform (CT) List 2 may be prohibitively large.

A third method is similar to the second method depicted in FIG. 3, except a company supplies Cancelable Transformed (CT) List 1 along with an unordered list of all the cancelable non-invertible biometric transforms used. The size of this list (T1) may be greater, equal to or less than the number of individuals in List 1, but is usually lower than this number. For instance, the company who owns List 1 may initially use transform 1 for all its customers, and only on request, or when the original is compromised, shift to a different transform. This process then proceeds as in method 2: List 2 is transformed with each of the possible cancelable non-invertible biometric transforms and a match is sought within CT List 1 for each of the transformed versions.

A fourth method is similar to the third method, except the list of cancelable non-invertible biometric transforms specifies which cancelable non-invertible biometric transform was used for each biometric in the database. Note that since the Cancelable Transforms are non-invertible, knowing the transform associated with a particular entry does not allow an interloper to recover the original biometrics. In this way privacy is preserved. Knowing which cancelable non-invertible biometric transform is needed for each entry of List 1 substantially reduces the total number of comparisons needed. In the third method (above) one might have to compare T1\*l2 transformed probes against a gallery of size L1. Here L1 is the cardinality of List 1, L2 is the cardinality of List 2, and T1 is the number of transformed used in CT List 1 (which could be as high as L1). This yields a worst case of $L1^2*L2$ comparisons. By contrast, if the enrollment transform is known for each individual in List 1, then for each of the T1 transforms L2 probes have to be compared against only a single record. This leads to a worst case of L1\*L2 comparisons for the forth method. The savings can be significant, especially since L1 tends to be much larger than L2.

In a fifth method, each record in database List 1 is transformed with the same cancelable non-invertible biometric transform (say, transform-399), then transformed a second time to generate CT List 1. This works because the cancelable transforms are cascadable—each generates an output in the same format as the input it received. Similarly, each record in watchlist List 2 is also transformed by the same transform (transform-399 again) to mask its true configuration. Then the first, second, third or fourth technique is used to find similarities. The advantage to this is that List 2 can be safely outsourced to a third party without revealing its members. The third party can then perform whatever additional transformations are required based on the supplied cancelable non-invertible biometric transform list, and run all the required matching. The result is a fairly anonymous statement like "record 5379 in List 1 seems to match record 13 in List 2".

Figure 4:
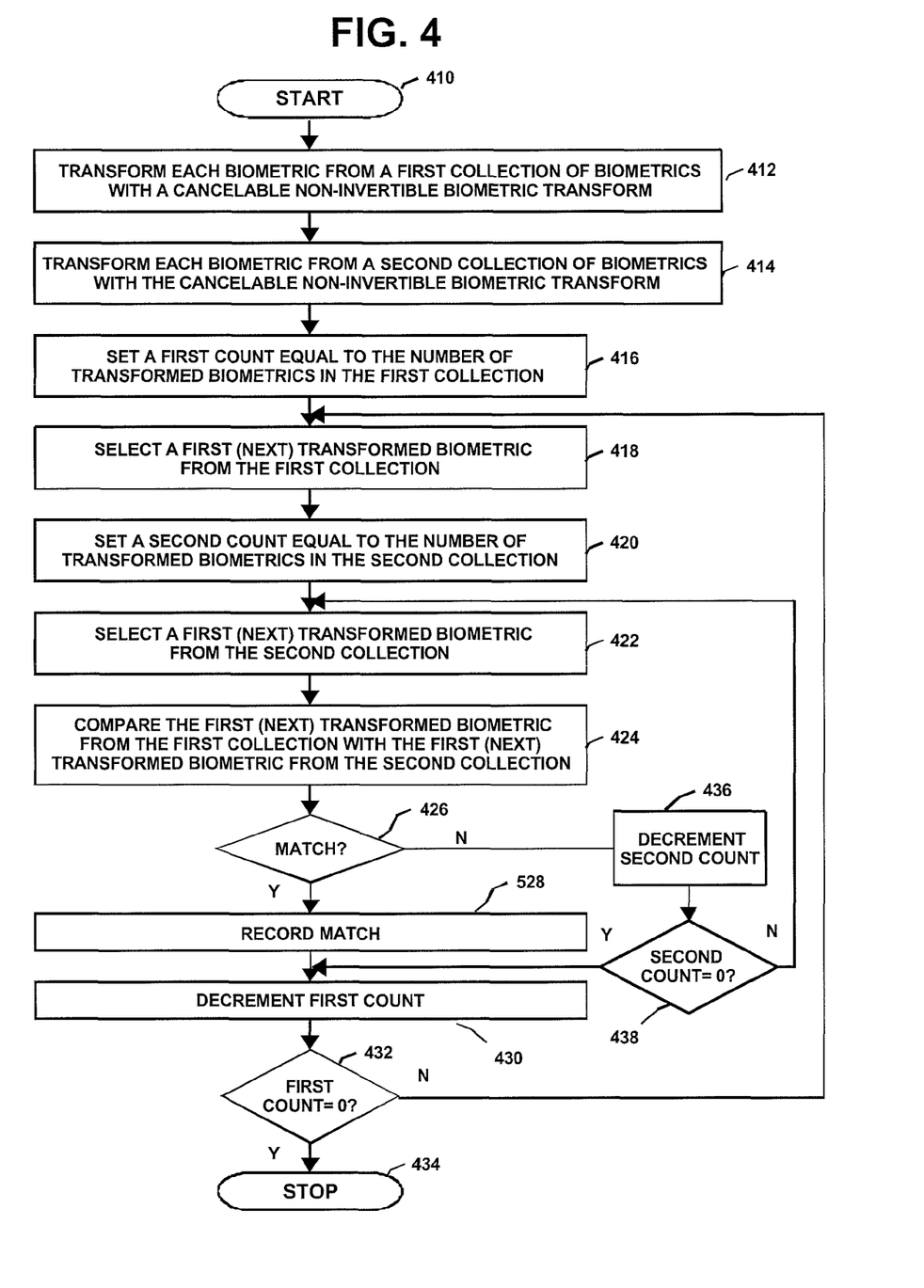
FIG. 4 is a flowchart depicting a method operating in accordance with the invention.
Figure 5:
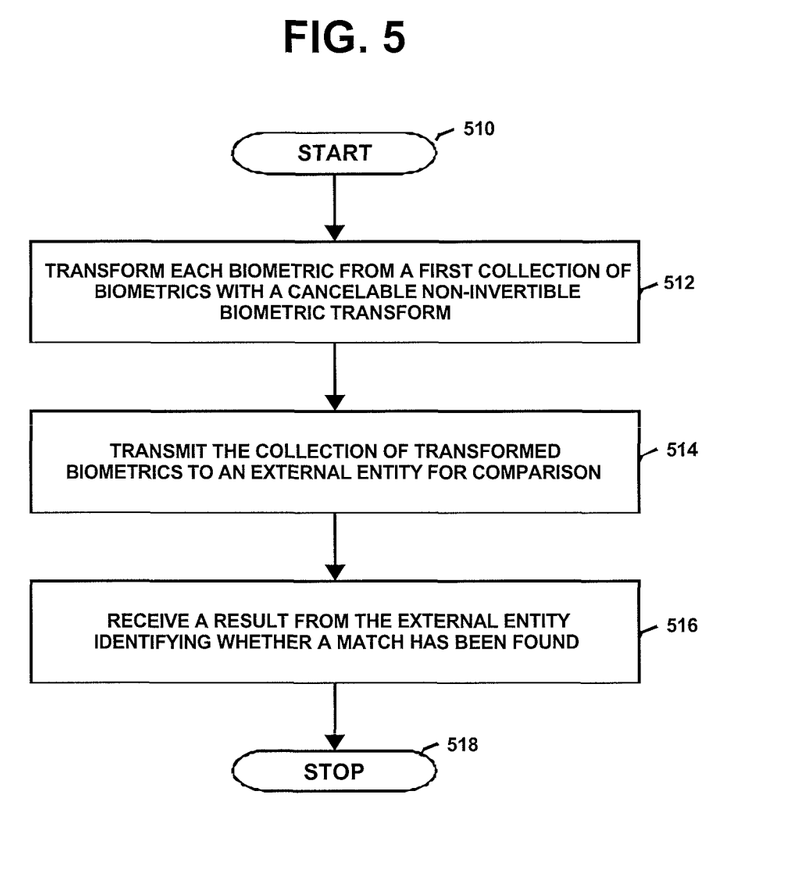
FIG. 5 is a flowchart depicting another method operating in accordance with the invention.
Figure 6:
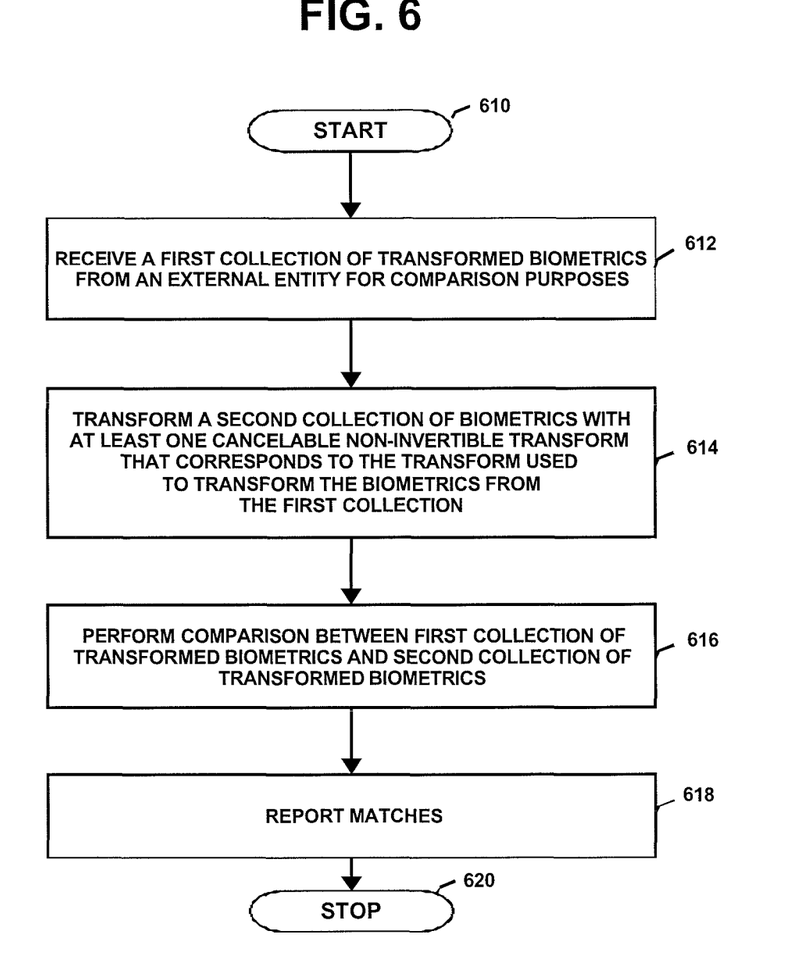
FIG. 6 is a flowchart depicting a further method operating in accordance with the invention.

FIGS. 4-6 are flowcharts summarizing methods operating in accordance with the invention that may be practiced in devices like those depicted in FIG. 1. The method of FIG. 4 starts at 410. Then, at 412, each biometric from a first collection of biometrics is transformed using a cancelable non-invertible biometric transform. Next, at 414, each biometric from a second collection of biometrics is transformed with the cancelable non-invertible biometric transform. Then, at 416, a first count is set equal to the number of transformed biometrics in the first collection. Next, at 418, a first (or next) transformed biometric is selected from the first collection of transformed biometrics. Then, at 420, a second count is set equal to the number of transformed biometrics in the second collection. Next, at 422, a first (or next) transformed biometric is selected from the second collection. Then, at 424, the first (or next) transformed biometric from the first collection is compared with the first (or next) transformed biometric from the second collection. At decision diamond 426, if there is a match, the method continues to 428 where the match is recorded. Later, the entities controlling the respective biometric collections will exchange data regarding the identity of the individual with the matching biometric. The method continues at 430 when the first count is decremented. If the first count is now zero, then this means that all the transformed biometrics from the first collection have been compared. The method then stops at 434. If the count is not zero, that means there are remaining transformed biometrics from the first collection that have to be compared, and the method returns to step 418 to select the next transformed biometric from the first collection to be compared to the transformed biometrics from the second collection. Returning to decision diamond 426, if there is no match, the method continues to 436 where the second count is decremented. If the second count is determined to be zero at decision diamond 438, this means that the current transformed biometric from the first collection has been compared to all the transformed biometrics from the second collection and no match has been found. From this point, the method continues to step 430 where the first count is decremented. As described previously, if the first count is now zero, the method stops. Otherwise it returns to step 418 to select the next transformed biometric from the first collection for comparison purposes. Returning to decision diamond 438, if the second count is determined to be not equal to zero, this means that there are remaining transformed biometrics from the second collection that need to be compared to the current transformed biometric from the first collection, so the method returns to step 422.

The method of FIG. 5 is intended to operate in apparatus used by a service entity like an airline that is not responsible for maintaining a security watch list, but instead collects biometrics while providing a service. The service entity nonetheless would like to have biometrics collected from, for example, passengers, compared to those collected from individuals on the security watch list. It does this by transferring the biometrics collected from passengers over a network in a system like that depicted in FIG. 1. The collection of biometrics is not transferred until after the biometrics have been transformed to preserve the anonymity of the biometrics. The method depicted in FIG. 5 starts at 510. Then, at 512, each biometric is transformed with a cancelable non-invertible biometric transform. Next, at 514, the collection of transformed biometrics is transferred to an external entity (for example, a government security agency or law enforcement entity) for comparison to biometrics collected from individuals on a security watch list. As described previously, the biometrics may be transferred along with an identification of cancelable non-invertible biometric transforms that may have been used to transform the biometrics. At least one of the identified cancelable non-invertible biometric transforms was actually used. Then, at 516, the service entity (for example, airline) receives back a result 516 indicating whether a match has been found.

The method depicted in FIG. 6 is typical of a method that would be performed at a security agency or law enforcement entity that is cooperating with service entities (like airlines) that collect biometrics for security purposes. The method starts at 610. Next, at 612, the security agency or law enforcement entity receives a first collection of transformed biometrics from the service entity for comparison purposes. As described previously, the first collection of transformed biometrics may be accompanied by an identification of cancelable non-invertible biometric transforms that may have been used to transform the first collection of biometrics. In such a case, then, at 614, a second collection of biometrics are transformed either using a cancelable non-invertible biometric transform known to have been used to transform the biometrics included in the first collection, or using the collection of transforms identified in the communication received from, for example, the service entity. Next, at 616, a comparison is performed between the first collection of transformed biometrics and second collection of transformed biometrics. If matches are found, they are reported to the service entity at 618 by the security agency or law enforcement entity. The method stops at 620.

Thus it is seen that the foregoing description has provided by way of exemplary and non-limiting examples a full and informative description of the best apparatus and methods presently contemplated by the inventors for implementing anonymous biometric matching. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A method comprising:
   transforming a first collection of biometrics and a second collection of biometrics with cancelable non-invertible biometric transforms from a collection of cancelable non-invertible biometric transforms, wherein the first collection of biometrics includes biometric information identifying individuals associated with the biometrics of the first collection, and wherein the first collection of biometrics is stored on a first server and identity information identifying the individuals associated with the biometrics is stored on a separate second server, said transforming comprises:
   for each biometric in the first collection, randomly selecting a cancelable non-invertible biometric transform from said collection of cancelable non-invertible biometric transforms and applying the selected cancelable non-invertible biometric transform to the biometric; and,
   for each biometric in the second collection, applying each cancelable non-invertible biometric transform from said collection of cancelable non-invertible biometric transforms to the biometric separately to create a collection of transformed biometrics for each biometric in the second collection;
   comparing the transformed biometrics from the first collection with the transformed biometrics from the second collection; and
   if a match is found, recording information identifying the match for determining the identity of the individual corresponding to the match based on the identity information stored on the second server.

2. The method of claim 1 wherein the number of separate cancelable non-invertible biometric transforms populating the collection of cancelable non-invertible biometric transforms is less when compared to the number of separate biometrics populating the first collection of biometrics.

3. The method of claim 1 wherein the number of separate cancelable non-invertible biometric transforms populating the collection of cancelable non-invertible biometric transforms is equal in number when compared to the number of separate biometrics populating the first collection of biometrics.

4. The method of claim 1 wherein the collection of cancelable non-invertible biometric transforms is greater in number when compared to the number of separate biometrics populating the first collection of biometrics.

5. The method of claim 1, wherein transforming a first collection of biometrics and a second collection of biometrics with cancelable non-invertible biometric transforms from a collection of cancelable non-invertible biometric transforms further comprises:
   creating a record for each transformed biometric from the first collection indicating which cancelable non-invertible biometric transform was used to transform the biometric.

6. The method of claim 5 wherein transforming a first collection of biometrics and a second collection of biometrics with cancelable non-invertible biometric transforms from a collection of cancelable non-invertible biometric transforms further comprises:
   for each biometric in the second collection, retrieving the record indicating the cancelable non-invertible biometric transforms used to transform each biometric from the first collection, and separately applying the cancelable non-invertible biometric transforms indicated in the record to create a collection of transformed biometrics for each biometric in the second collection.

7. The method of claim 6 wherein comparing transformed biometrics from the first collection with transformed biometrics from the second collection further comprises:
   for each transformed biometric from the first collection, identifying the transformed biometrics from the second collection generated with the same cancelable non-invertible biometric transform as applied to the biometric from the first collection, and comparing the transformed biometric from the first collection with transformed biometrics from the second collection generated using the same cancelable non-invertible biometric transform.

8. An apparatus, comprising:
one or more processors; and
one or more memories including computer program code,
the one or more memories and the computer program code configured to, with the one or more processors, cause the apparatus to perform at least the following:
transforming a first collection of biometrics and a second collection of biometrics with cancelable non-invertible biometric transforms from a collection of cancelable non-invertible biometric transforms, wherein the first collection of biometrics includes biometric information identifying individuals associated with the biometrics of the first collection, and wherein the first collection of biometrics is stored on a first server and identity information identifying the individuals associated with the biometrics is stored on a separate second server,
wherein said transforming comprises:
for each biometric in the first collection, randomly selecting a cancelable non-invertible biometric transform from said collection of cancelable non-invertible biometric transforms and applying the selected cancelable non-invertible biometric transform to the biometric; and,
for each biometric in the second collection, applying each cancelable non-invertible biometric transform from said collection of cancelable non-invertible biometric transforms to the biometric separately to create a collection of transformed biometrics for each biometric in the second collection
comparing the transformed biometrics from the first collection with the transformed biometrics from the second collection; and
if a match is found, recording information identifying the match for determining the identity of the individual corresponding to the match based on the identity information stored on the second server.

9. The apparatus of claim 8 wherein the number of separate cancelable non-invertible biometric transforms populating the collection of cancelable non-invertible biometric transforms is less when compared to the number of separate biometrics populating the first collection of biometrics.

10. The apparatus of claim 8 wherein the number of separate cancelable non-invertible biometric transforms populating the collection of cancelable non-invertible biometric transforms is equal in number when compared to the number of separate biometrics populating the first collection of biometrics.

11. The apparatus of claim 8 wherein the collection of cancelable non-invertible biometric transforms is greater in number when compared to the number of separate biometrics populating the first collection of biometrics.

12. The apparatus of claim 9, wherein transforming a first collection of biometrics and a second collection of biometrics with cancelable non-invertible biometric transforms from a collection of cancelable non-invertible biometric transforms further comprises:
creating a record for each transformed biometric from the first collection indicating which cancelable non-invertible biometric transform was used to transform the biometric.

13. The apparatus of claim 12, wherein transforming a first collection of biometrics and a second collection of biometrics with cancelable non-invertible biometric transforms from a collection of cancelable non-invertible biometric transforms further comprises:
for each biometric in the second collection, retrieving the record indicating the cancelable non-invertible biometric transforms used to transform each biometric from the first collection, and separately applying the cancelable non-invertible biometric transforms indicated in the record to create a collection of transformed biometrics for each biometric in the second collection.

14. The apparatus of claim 13 wherein comparing transformed biometrics from the first collection with transformed biometrics from the second collection further comprises:
for each transformed biometric from the first collection, identifying the transformed biometrics from the second collection generated with the same cancelable non-invertible biometric transform as applied to the biometric from the first collection, and comparing the transformed biometric from the first collection with transformed biometrics from the second collection generated using the same cancelable non-invertible biometric transform.

* * * * *